Patented Dec. 5, 1933

1,938,047

UNITED STATES PATENT OFFICE 1,938,047

NEW QUINOLINE DERIVATIVE

Fritz Schönhöfer and Hans Andersag, Elberfeld, Germany, assignors to Winthrop Chemical Company, Inc., New York, N. Y., a corporation of New York No Drawing. Application March 6, 1931, Serial No. 520,709, and in Germany March 12, 1930

12 Claims. (Cl. 260—38)

The present invention relates to new 5.6-dialkoxy-8-amino-quinolines containing basic substituents in the amino group.

U. S. Patent No. 1,747,531 describes processes for the manufacture of amino-quinoline and derivatives and substitution products thereof which compounds are substituted by basic residues in the amino group.

As the result of further experiment and research and in accordance with the present invention 5.6-dialkoxy-8-amino-quinolines containing basic substituents in the amino group are produced, more particularly quinoline derivatives of the probable formula:—

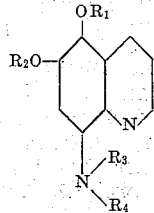

wherein $R_1$ and $R_2$ stand for alkyl groups, such as the methyl, ethyl, allyl, isopropyl, butyl, isoamyl and hexyl group, $R_3$ stands for a basic radical containing nitrogen and $R_4$ stands for hydrogen, an alkyl group or likewise for a basic radical containing nitrogen. These basic radicals may contain one or more nitrogen atoms, they may be represented by aliphatic, alicyclic, aromatic or heterocyclic nitrogen containing radicals. Likewise such radicals wherein aliphatic and alicyclic or aromatic or heterocyclic radicals are connected with each other may be used. These radicals may contain ether like bound oxygen and sulfur atoms and may be substituted by other substituents, for example, hydroxyl groups. Therefrom it results that basic radicals of the most different kind may be employed, for example, dimethyl-amino-ethyl, ethyl-amino-butyl, diethyl-amino-pentyl, amino-cyclohexyl-or-cyclopentyl, amino-hydroxy-pentyl, N-piperidyl-methyl, N-pyrrolidyl-propyl and the like.

Such products have not hitherto been described. It has been established that these products are distinguished from the already described nuclear substitution products of the N-substituted amino-quinolines in that they possess a quite particularly favorable relation between therapeutic and toxic action. In general the new bases are yellowish oils which are soluble in the usual organic solvents and form with mineral- and the simple fatty-acids, for example, acetic acid water soluble salts.

The new 5.6-dialkoxy-8 - amino - quinolines, substituted by basic radicals in the amino group, can be obtained by the same methods as have already been described in U. S. Patent No. 1,747,531. Thus for example, 5.6-dialkoxy-8-amino-quinolines can be converted by treatment with the esters of amino-or alkylamino-alkyl-alcohols, for example, those of the halogen hydracids or aromatic sulfonic acids or salts thereof (see, for example, U. S. Patent No. 1,752,617) into 5.6-dialkoxy-8-amino-quinolines substituted by basic radicals in the amino group. It is sometimes advantageous to use instead of the alkylating agents specified, derivatives thereof, for example, halogenalkylphthalimides and subsequently to decompose into the corresponding amino compounds the primarily produced intermediate products. Likewise the basic radicals can be introduced into the amino group in the manner known per se in several steps, for example, by first causing an alkylene dihalide, ethylene oxide or a halogenated alcohol to act on a 5.6-dialkoxy-8-amino-quinoline and converting the hydroxy- or halogen-alkylamino derivatives thus produced into the corresponding basically substituted 5.6-dialkoxy-8-amino-quinolines in the customary manner, if desired, by way of the halides. Instead of starting from the 5.6-dialkoxy-8-amino-quinolines, such compounds can also be chosen for the starting material as contain in the 5- and 6-positions or the 5- or 6-position substituents capable of being converted into alkoxy groups. Such substituents are primarily hydroxyl groups, amino groups and nitro groups. It is immaterial whether those reactive substituents are already present when the N-alkylation of the 8-amino-quinoline is carried out or whether they are introduced only after the alkylation has been effected. Thus for example, the amino group can be introduced by the action of diazo compounds on 6-hydroxy- or 6-alkoxy-8-amino-quinoline compounds and reduction of the resulting 5-azo compound and then converting the same in the customary manner into alkoxy groups, together with the 6-hydroxy group, if necessary.

Instead of starting from 8-amino-quinoline compounds the production of the new bases can likewise be carried out by treating aliphatic diamines in which at least one of the amino groups is a primary or secondary amino group, with such quinoline compounds, as contain reactive substituents in the 8-position and in which the 5.6-positions are occupied by alkoxy groups or by groups capable of conversion into alkoxy groups. Thus, for example, 6-alkoxy-5.8-dinitro-quinolines or 6-alkoxy-5-nitro-8-halogenquinolines can be converted by means of diamines of the kind specified into the 6-alkoxy-5-nitro-8-amino-quinolines, substituted by basic radicals in the amino group, the nitro group in the 5-position being subsequently converted by the customary methods into the alkoxy group.

Finally the process can also be carried out by using for the synthesis of the 5.6-dialkoxy-8-amino-quinolines containing basic substituents in the amino group in accordance with one of the before mentioned methods or any other customary methods the intermediate products capable of being used for the quinoline synthesis. For this purpose, for example, 1.2-dialkoxy-4-alkylaminoalkylamino-5-aminobenzenes are produced in the customary manner and subjected to one of the known quinoline syntheses. Instead of starting from the dialkoxy compounds there can obviously be selected as the starting material such compounds, as contain in the corresponding positions substituents capable of being converted into the alkoxy group. Primary and secondary 8-amino-quinolines or corresponding intermediate products can be subjected to the conversion into the basically substituted 5.6-dialkoxy-8-amino-quinolines.

The invention is illustrated by the following examples, without being restricted thereto:—

*Example 1*

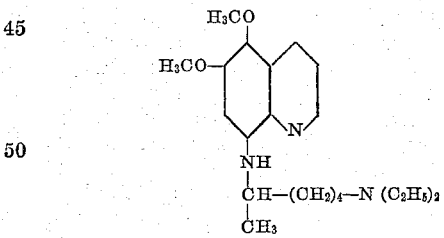

20 parts by weight of the compound of formula:

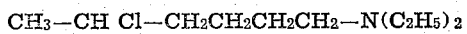

CH$_3$—CH Cl—CH$_2$CH$_2$CH$_2$CH$_2$—N(C$_2$H$_5$)$_2$ are heated for 10 hours first at 80° C. and then at 100° C. with 20.5 parts by weight of 5.6-dimethoxy-8-amino-quinoline (melting point 148° C.) and 8 parts of water. After cooling dilute caustic soda is added until alkaline and steam are passed through for a short time. The residue is extracted with ether and the ethereal solution dried with potassium carbonate, filtered and the ether evaporated. The oil which remains is distilled in a high vacuum. The new base, a light yellow oil, boils under 2 mms. pressure at 205° C. Its composition corresponds with the above probable formula. Ethereal hydrochloric acid forms a strongly hydroscopic reddish yellow hydrochloride, being soluble in water.

In an analogous manner by reacting upon 5.6-dimethoxy-8-amino-quinoline with an equimolecular amount of an ester of an amino alcohol, other similar compounds can be obtained, for example:

(a) with the hydrobromide of α-diethylamino-δ-bromopentane the product of the probable formula:

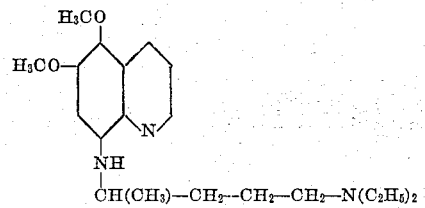

as a light yellow oil of boiling point 203° C. under 2 mms. pressure, which forms a reddish yellow hydrochloride soluble in water.

The same compound is obtained by boiling 204 parts by weight of 5.6-dimethoxy-8-amino-quinoline with 349 parts by weight of the hydrochloride of the para-toluene sulfonic acid ester of 4-diethylamino - 1 - methyl - 1 - oxybutane and 136 parts by weight of sodium acetate in 200 parts by weight of alcohol for 6–8 hours. After distilling off the alcohol the mixture is worked up as above described.

(b) with α-(diethylaminoethyl-ethylamino)-β - methyl - γ - chlorobutane - hydrochloride (see German Patent 486,079, page 6) the compound of the probable formula:

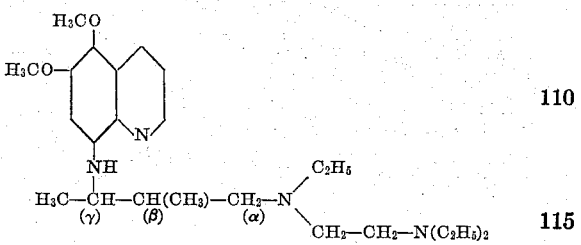

as a light yellow oil of boiling point 218–220° C. under 1 mm. pressure.

(c) with 1-diethylamino-2-methyl-butylene-3.4-oxide (see the corresponding methyl compound, British specification No. 267,169, page 7), the product of the probable formula:—

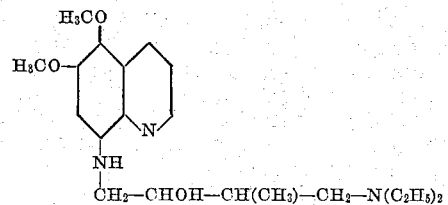

as a light yellow oil of boiling point 195° C. under 0.5 mm. pressure.

(d) with β-diethylamino-β'-chlorodiethylether (see Brit. specification No. 286,087, Example 1) the product of the probable formula:

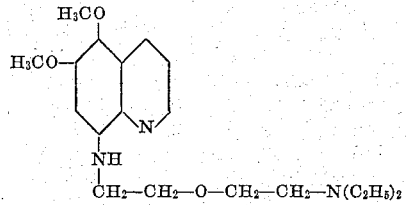

as a light yellow oil of boiling point 225–227° C. under 0.5 mm. pressure.

(e) with β-diethylamino-β'-chloro-diethylthio-ether-hydrochloride (see Brit. specification No. 150

286,087, Example 3) the compound of the probable formula:—

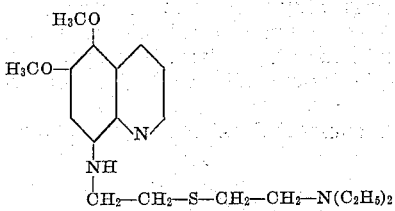

as a light yellow oil of boiling point 245–250° C. under 0.5 mm. pressure, being easily oxidized in the air.

(f) with 1-dimethylamino-2-cyclohexylbromide-hydrobromide (see Brit. specification No. 282,453, Example 2) the product of the probable formula:

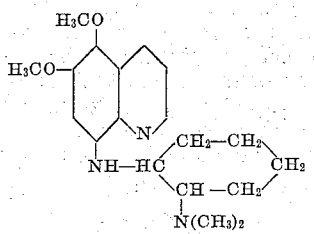

as a light yellow oil of boiling point 205–210° C. under 1 mm. pressure, when cooling solidifying to a glassy mass.

(g) with N-(ω-chloroethyl)-piperidine (see Brit. specification No. 282,453, Example 1) the product of the probable formula:

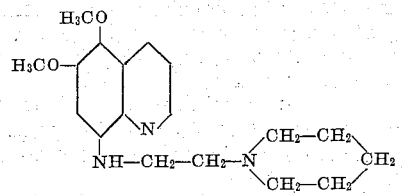

as a light yellow oil of boiling point 205° C. under 0.5 mm. pressure solidifying when cooling.

In an analogous manner the compound of the probable formula:

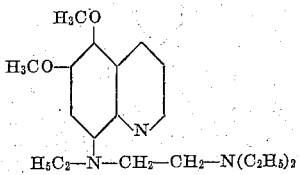

is obtained when reacting upon 5.6-dimethoxy-8-ethylamino-quinoline with diethylaminoethyl-chloride, as a light yellow oil, boiling under 3 mm. pressure at 200–205° C.

By treating with an ethereal solution of hydrochloric acid there are obtained light yellow or reddish colored hygroscopic hydrochlorides of the bases.

*Example 2*

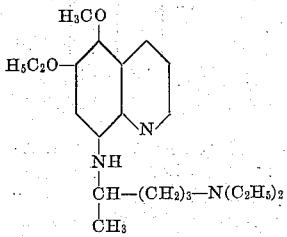

65 parts by weight of 5-methoxy-6-ethoxy-8-amino-quinoline (melting point 119° C.) are melted for 8 hours at 130–140° C. with 50 parts by weight of the substance of the formula:—

$CH_3—CH\ Br—CH_2—CH_2—CH_2—N(C_2H_5)_2.HBr$

When the reaction is complete the reaction mixture is worked up as described in Example 1. The new base, a light yellow oil, boils at 200° C. under 1.5 mms. pressure. Its composition corresponds with the above probable formula. The reddish yellow hydrochloride is very hygroscopic and readily soluble in water.

*Example 3*

20 grams of 5.6-dimethoxy-8-amino-quinoline are heated in a bomb tube with 12 grams of allyl-bromide at 130–140° C. for 3–4 hours. After completing the reaction the mixture is rendered alkaline with dilute caustic soda lye and the base taken up with ether. After drying and evaporating the ethereal solution the remainder is fractionated in a high vacuum. The 5.6-dimethoxy-8-allylaminoquinoline obtained boils under 1 mm. pressure at 160–165° C.

24 grams of this base are dissolved in hydrobromic acid of specific gravity 1.7. After standing for several days at room temperature the addition of hydrobromic acid to the double bond is complete. Then the excess hydrobromic acid is distilled off in vacuo and the remainder treated with a benzene solution of diethylamine, containing 30 grams of the latter. When the reaction is complete the benzene solution is agitated with dilute caustic soda lye, separated, dried with potassium carbonate, filtered and the benzene evaporated. The remainder is fractionated. The 5.6 - dimethoxy-8-(diethylamino-propylamino) - quinoline boils under 2 mms. pressure as a light yellow oil at 198° C.

*Example 4*

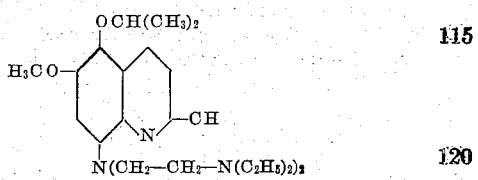

39 grams of 1-isopropyloxy-2-methoxy-4-bisdiethylaminoethyl-amino - 5 - aminobenzene (boiling point under 1 mm. pressure 198–200° C. a readily oxidizable oil) are dissolved in 80 grams of 30% hydrochloric acid with the addition of 100 grams of water and heated to 90–95° C. under a reflux condenser with stirring. 10 grams of paraldehyde are then slowly dropped in in the course of 12 hours. When the reaction is complete caustic soda is added until alkaline, then the whole extracted with ether and the ethereal solution dried with potassium carbonate. After evaporating the ether the residue is fractionated in a high vacuum. A light yellow oil of the above probable constitution is obtained, which boils under 1 mm. pressure at 225–230° C. and readily oxidizes with darkening. It forms with ethereal hydrochloric acid a reddish yellow hygroscopic hydrochloride.

*Example 5*

20.4 grams of 5.6-dimethoxy-8-amino-quinoline are heated in a tube with 5 grams of ethylene oxide at 150° C. for 8 hours. The reaction mass is taken up in chloroform and fractionated after the evaporation of the solvent. Thereby the 5.6-dimethoxy-8-(β-hydroxy-ethylamino) -quinoline distils as a viscous oil under 1 mm. pressure and at a temperature of 185–190° C. The oil is dissolved in 500 ccs. of dry benzene and boiled with 12 grams of thionylchloride under a reflux condenser until no more sulfur dioxide escapes. 15 grams of diethylamine are added while cooling and the mixture is heated to boiling under a reflux condenser for 3 hours. When the mixture is cold the benzene solution is shaken several times with dilute caustic soda lye, dried over potassium carbonate and filtered. The residue obtained by the evaporation of the benzene is fractionated.

The new base of the probable formula:—

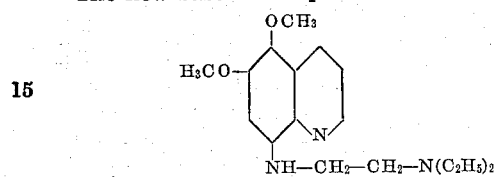

distils under 3 mms. pressure as a light yellow oil of the boiling point 195–197° C.

We claim:—

1. The compounds of the probable formula:—

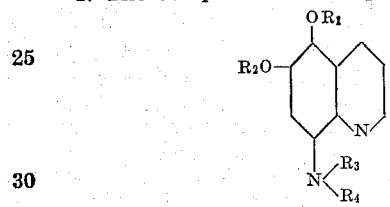

wherein $R_1$ and $R_2$ stand for alkyl groups, $R_3$ stands for a basic radical containing nitrogen as a primary, secondary or tertiary amine, and $R_4$ stands for hydrogen, alkyl or a basic radical containing nitrogen as a primary, secondary or tertiary amine said products being yellowish oils, soluble in organic solvents, soluble in water in form of their salts with mineral- and the simple fatty acids, displaying a therapeutic action.

2. The compounds of the probable formula:—

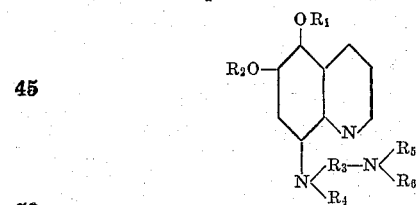

wherein $R_1$ and $R_2$ stand for alkyl groups, $R_3$ stands for a radical of the group consisting of alkyl, hydroxyalkyl, alkoxyalkyl, alkylthioalkyl and alicyclic groups, $R_5$ and $R_6$ stand for hydrogen, alkyl or alkylaminoalkyl groups or jointly stand for an alkylene group, $R_4$ stands for hydrogen, alkyl or the group

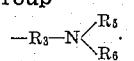

said products being yellowish oils, soluble in organic solvents, soluble in water in form of their salts with mineral- and the simple fatty acids, displaying a therapeutic action.

3. The compounds of the probable formula:—

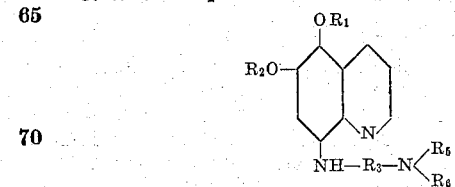

wherein $R_1$ and $R_2$ stand for alkyl groups, $R_3$ stands for a radical of the group consisting of alkyl, hydroxyalkyl, alkoxyalkyl, alkylthioalkyl and alicyclic groups, $R_5$ and $R_6$ stand for hydrogen, alkyl or alkylaminoalkyl groups or jointly stand for an alkylene group, said products being yellowish oils, soluble in organic solvents, soluble in water in form of their salts with mineral- and the simple fatty acids, displaying a therapeutic action.

4. The compounds of the probable formula:—

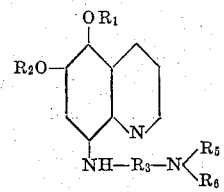

wherein $R_1$ and $R_2$ stand for alkyl groups, $R_3$ stands for a radical of the group consisting of alkyl, alkoxyalkyl and alkylthioalkyl groups, $R_5$ and $R_6$ stand for hydrogen or alkyl, said products being yellowish oils, soluble in organic solvents, soluble in water in form of their salts with mineral- and the simple fatty acids, displaying a therapeutic action.

5. The compounds of the probable formula:—

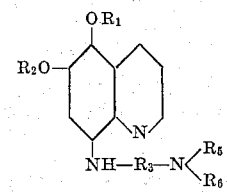

wherein $R_1$ and $R_2$ stand for alkyl groups containing up to 6 carbon atoms, $R_3$ stands for a radical of the group consisting of alkyl, alkoxyalkyl and alkylthioalkyl groups, $R_5$ and $R_6$ stand for hydrogen or alkyl, said products being yellowish oils, soluble in organic solvents, soluble in water in form of their salts with mineral- and the simple fatty acids, displaying a therapeutic action.

6. The compounds of the probable formula:—

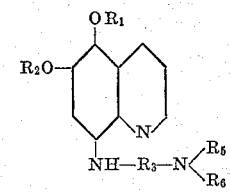

wherein $R_1$ and $R_2$ stand for alkyl groups, containing up to 6 carbon atoms, $R_3$ stands for a radical of the groups consisting of alkyl, alkoxyalkyl and alkylthioalkyl groups, $R_5$ and $R_6$ stand for alkyl groups, said products being yellowish oils, soluble in organic solvents, soluble in water in form of their salts with mineral- and the simple fatty acids, displaying a therapeutic action.

7. The compounds of the probable formula:—

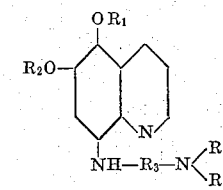

wherein $R_1$ and $R_2$ stand for alkyl groups, containing up to 6 carbon atoms, $R_3$ stands for an alkyl group containing up to 6 carbon atoms, $R_5$ and $R_6$ stand for alkyl groups, said products being yellowish oils, soluble in organic solvents, soluble in water in form of their salts with mineral- and the simple fatty acids, displaying a therapeutic action.

8. The compounds of the probable formula:—

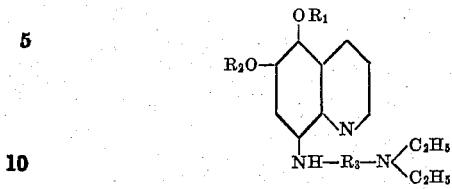

wherein $R_1$ and $R_2$ stand for alkyl groups, containing up to 6 carbon atoms, $R_3$ stands for an alkyl group containing up to 6 carbon atoms, said products being yellowish oils, soluble in organic solvents, soluble in water in form of their salts with mineral- and the simple fatty acids, displaying a therapeutic action.

9. The compounds of the probable formula:—

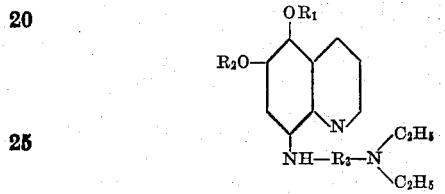

wherein $R_1$ and $R_2$ stand for methyl or ethyl groups, $R_3$ stands for an alkyl group containing up to 6 carbon atoms, said products being yellowish oils, soluble in organic solvents, soluble in water in form of their salts with mineral- and the simple fatty acids, displaying a therapeutic action.

10. The compound of the probable formula:—

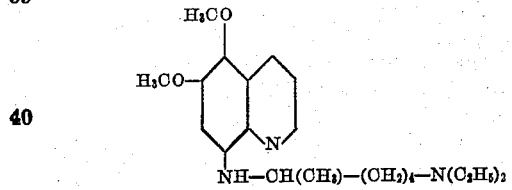

said product being a light yellow oil, boiling under 2 mms. pressure at 205° C., soluble in organic solvents, forming with hydrochloric acid a strongly hygroscopic, reddish yellow hydrochloride soluble in water, displaying a therapeutic action.

11. The compound of the probable formula:—

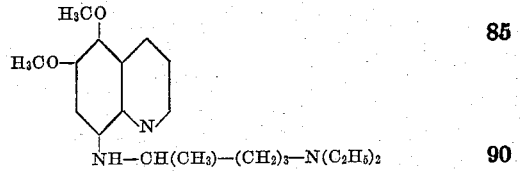

said product being a light yellow oil, boiling under 2 mms. pressure at 203° C., soluble in organic solvents, forming with hydrochloric acid a strongly hygroscopic reddish yellow hydrochloride soluble in water, displaying a therapeutic action.

12. The compound of the probable formula:—

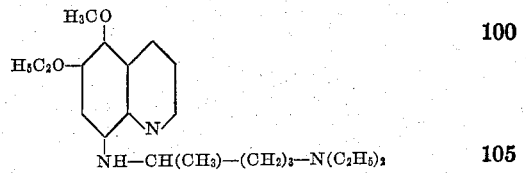

said product being a light yellow oil, boiling under 1.5 mms. pressure at 200° C., soluble in organic solvents, forming with hydrochloric acid a strongly hygroscopic reddish yellow hydrochloride soluble in water, displaying a therapeutic action.

FRITZ SCHÖNHÖFER.
HANS ANDERSAG.